United States Patent [19]

Brecher

[11] 3,765,821

[45] Oct. 16, 1973

[54] FLASH LAMP
[75] Inventor: Charles Brecher, Little Neck, N.Y.
[73] Assignee: GTE Laboratories Incorporated, Waltham, Mass.
[22] Filed: Oct. 14, 1971
[21] Appl. No.: 189,134

[52] U.S. Cl. .................................................. 431/93
[51] Int. Cl. ............................................. F21k 5/02
[58] Field of Search ................................ 431/93–95

[56] References Cited
UNITED STATES PATENTS

| | | | |
|---|---|---|---|
| 2,431,162 | 11/1947 | Blake et al. | 431/95 |
| 2,554,094 | 5/1951 | De Vriend et al. | 431/95 |
| 3,301,021 | 1/1967 | Nijland et al. | 431/95 |
| 3,377,126 | 4/1968 | Nijland et al. | 431/94 |
| 3,415,605 | 12/1968 | Van der Tas et al. | 431/93 |

*Primary Examiner*—Carroll B. Dority, Jr.
*Attorney*—Irving M. Kriegsman

[57] ABSTRACT

A flash lamp comprising a sealed transparent bulb containing a solid substance and an oxidant gas, and having an ignition mechanism associated therewith. The solid substance is coated with a combustion accelerator which decreases the time from ignition of the solid substance until the luminous flux created by such ignition increases to its maximum value. The combustion accelerator is a totally halogenated inorganic or organic compound having at least one chlorine atom in its molecular structure.

16 Claims, No Drawings

FLASH LAMP

BACKGROUND OF THE INVENTION

This invention relates to a combustion flash bulb lamp of the type producing useful electromagnetic radiation by the reaction of a solid substance with an oxidant gas.

Conventional lamps of this type generally comprise a sealed transparent bulb, made usually of glass, which contains a shredded metallic material in an oxidant atmosphere. The lamp also contains, or has associated therewith, an ignition mechanism for inducing a light-generating reaction between the solid substance and the gaseous oxidant atmosphere. In a conventional structure, a paste of a mixture of zirconium powder, lead dioxide and nitrocellulose is provided on a tungsten wire which can be caused to glow electrically. When an electric current of sufficient strength is passed through the tungsten wire, the paste explodes and causes the shredded metallic material to burn. At the elevated temperatures caused by the burning of the shredded metal, the metal reacts with the oxidant atmosphere to generate light which can be directed at a subject for photographic purposes.

When employed in such photographic applications, the light-time characteristics of the flash lamp must match the exposure characteristics of the camera shutters and the spectral distribution of the light emanating from the lamp must be adapted to the spectral sensitivity of the photographic film. Thus, the spectral distribution of the luminous energy should be close to that of daylight, the emitted quantity of light should be as large as possible, and the relationship between the luminous flux and time should correspond to the properties of the camera shutter.

With regard to the latter factor, many flash systems have a "time-to-full-peak" (i.e. the time for the luminous flux to incresae to its maximum value) which is too long when compared to the time during which the camera shutter is open. At least for those applications, such a flash system therefore becomes unsatisfactory. In Nijland et al. U.S. Pat. 3,301,021 there is described a flash lamp having a gas filling consisting of fluorine or one or more volatile fluorine compounds which dissociate at elevated temperatures. A major disadvantage of such flash lamps, wherein fluorine or a volatile fluorine compound is utilized to react with the shredded metal, is that the "time-to-full-peak" is generally at least a factor of 3 too slow for normal photographic purposes. Accordingly, Nijland et al. increased the combustion speed and hence lowered the time-to-full-peak by adding to the fill gas a volatile hydrocarbon compound. Recent studies with such additives, however, have shown that such additives react much too readily with fluorine or the volatile fluorine compounds to be satisfactory and in some cases are so reactive as to ignite spontaneously. Obviously, the use of such materials would not be satisfactory for commercial products.

It is, therefore, desirable to have an improved flash lamp of the fluorine oxidant type having a decreased time-to-full-peak.

OBJECTS OF THE INVENTION

It is, therefore, an object of the present invention to provide an improved flash lamp.

It is a further object of the present invention to provide an improved flash lamp having a descreased time-to-full-peak.

It is a further object of the present invention to provide an improved flash lamp wherein the solid substance is intimately contacted by a combustion accelerator which, upon ignition, decreases the time-to-full-peak.

It is a further object of the present invention to provide an improved flash lamp wherein the solid substance is coated with a time-to-full-peak accelerator.

Yet a still further object of the present invention is to provide a flash lamp of the fluorine oxidant type which has a decreased time-to-full-peak attained by coating the solid substance within the bulb with a combustion accelerator.

These and still further objects, features and advantages of the present invention will become apparent upon consideration of the following detailed disclosure.

BRIEF SUMMARY OF THE INVENTION

These and still further objects of the present invention are acheived, in accordance therewith, by providing a flash lamp having a sealed transparent bulb containing a solid metallic substance, an oxidant gas, and an ignition mechanism therein or associated therewith.

The solid substance to be burned upon ignition of the flash lamp may be selected, as is well known in this field, from the elements of the third group of the Periodic Table, the rare earth metals, the actinides, and the fourth subgroup of the Periodic Table, including, for example, boron, aluminum, scandium, ytterbium, lanthanum, cerium, and other rare earths, actinium, thorium, titanium, zirconium, and hafnium. Those elements of moderate price which can readily be formed into wires, foils, or shreds are particularly useful. This applies, for example, to aluminum, zirconium, hafnium and magnesium.

Coated onto the solid metallic substance is a combustion accelerator which has the effect, upon ignition, of the solid substance by conventional techniques of decreasing the time-to-full-peak. The combustion accelerator comprises a totally halogenated inorganic or organic compound having at least one chlorine atom in its molecular structure. The accelerator, in solid form, is coated onto the solid substance whereby, upon and during ignition, the intimate contact of the two materials serves to decrease the time for the luminous flux to increase to its maximum value.

The decrease in the time to reach maximum luminous flux can be achieved, for example, by coating the solid substance to be ignited with a combustion accelerator grease, such as hexachloroethane or a poly-monochloro-trifluoro-ethylene grease (i.e., Kel-F, a proprietary product of Kellogg Co.). Optionally, the solid accelerator can be deposited onto the solid substance by solution coating techniques, after which the vehicle is removed leaving the accelerator uniformly coated onto the surface of the solid substance.

Use of solid bromo and/or iodo halogenated or mixed halogenated compounds are presently contemplated to the extent that such compounds are sufficiently stable throughout the anticipated storage life of the flash lamp. For example, such compounds to be satisfactory for use in this invention should not spontaneously ignite when the fluorine oxidant is added to the bulb during flash lamp manufacture. Additionally, such materials should not react with the fluorine oxidant during storage whereby upon ignition the desired effect of decreased time-to-full-peak will not be achieved.

It is also contemplated that mixtures of accelerating additives may be found suitable for use in the practice of the present invention.

The oxidant gas comprises elemental fluorine or a volatile or gaseous fluorine compound which will dissociate into fluorine upon ignition of the solid metallic substance. Compounds which are stable at room temperature (or at those temperatures expected to be experienced during storage of the flash lamp) and which readily dissociate under flash lamp ignition conditions to yield fluorine include, as is well known in this art, oxygen fluoride ($OF_2$), nitrogen fluorides ($NF_3$, $N_2F_2$, $N_2F_4$), nitrosyl fluoride ($NOF$), nitryl fluoride ($NO_2F$), chlorine fluorides ($ClF_3$, $ClF$), iodine fluorides ($IF_5$, $IF_7$), etc. or mixtures thereof.

It has been found that with the accelerators of the present invention the time-to-full-peak can be reduced by about 40% – 60% over corresponding flash lamps without the accelerator. While this decrease does not lower the time-to-full-peak to the most desirable range for general photographic purposes, it is still a significant decrease which enables the light output of a flash lamp to be tailored for a particular photographic application.

DESCRIPTION OF SPECIFIC EMBODIMENTS

The following Examples are given to enable those skilled in the art to more clearly understand and practice the present invention. They should not be considered as a limitation upon the scope of the invention but merely as being illustrative thereof.

In the following Examples, a flash lamp having a glass bulb 2 inches long, five-eighths inch diameter, and a capacity of approximately 8 cm³ is filled with one-half millimole of combustion accelerator-coated shredded metal and clamped down on a gasket to provide an airtight seal. After the air therein is withdrawn, fluorine as the oxidant gas is admitted. The flash lamp is then ignited and a time-to-full-peak measurement taken by conventional techniques.

The shredded metal is in the form of 4 inch strands, 0.93 or 0.97 mil thick and 1.8 mil wide.

When such a lamp is filled with one-half millimole of zirconium and fluorine to a total pressure of 3 atmospheres absolute, upon ignition the time-to-full-peak is about 45 msec.

When such a lamp is filled with one-half millimole of hafnium and fluorine to a total pressure of 3 atmospheres absolute, upon ignition the time-to-full-peak is about 70 msec.

EXAMPLE I

In this Example, zirconium strands are coated with a grease of poly-monochloro-trifluoro-ethylene prior to the introduction of the strands into the bulb. Upon ignition, the time-to-full-peak is about 28 msec.

EXAMPLE II

In this Example, zirconium strands are coated with hexa-chloro-ethane prior to the introduction of the strands into the bulb. Upon ignition, the time-to-full-peak is about 30 msec.

EXAMPLE III

In this Example, hafnium strands are coated with a grease of poly-monochloro-trifluoro-ethylene prior to the introduction of the strands into the bulb. Upon ignition, the time-to-full-peak is about 30 msec.

EXAMPLE IV

In this Example, hafnium strands are coated with hexachloro-ethane prior to the introduction of the strands into the bulb. Upon ignition, the time-to-full-peak is about 26 msec.

It is then apparent that with zirconium strands there is achieved about a 40 percent decrease in the time-to-full-peak while with hafnium strands there is an approximate 60 percent decrease. As indicated above, this decrease enables the light output from such a flash lamp to be tailored for particular photographic applications.

The data given in these Examples are individual run test data and not averages of a number of test runs. However, this data is considered representative of the results which can be obtained if the combustion accelerators broadly described herein are utilized in accordance with the teachings of this invention.

The use of the additives herein described is contemplated to be applicable to both low pressure flash lamps (having less than 3 atmospheres oxidant gas) and high pressure flash lamps (having greater than 3 atmospheres oxidant gas).

The present invention is considered distinct and different from the teachings of Nijland et al. U.S. Pat. No. 3,377,126 wherein it is taught that polymeric fluorinated hydrocarbon compounds can be coated on the interior bulb wall surfaces to prevent the deposition thereon of light absorbing layers which would limit the total output from such bulbs during use. As used by Nijland et al., the coatings are not reported to have any accelerating effect on the combustion of the solid substance, nor does it appear to perform such a function.

Although the materials utilized by Nijland et al. fall within the broad class of materials found suitable for use in the present invention, their use by Nijland et al. as coatings upon the inner flash bulb wall is considered as a positioning too remote from the oxidizable solid substance to achieve the decrease in the time from ignition to the time when the luminous flux reaches its maximum value. In the present invention it is the intimate and direct contact of the solid substance with the combustion accelerator during ignition that is believed to cause the advantageous results herein described. Accordingly, the positioning as herein described, and the resultant decrease in the time-to-full-peak, is not believed to be apparent from the teachings of Nijland et al.

While the present invention has been described with reference to specific embodiments thereof, it will be understood by those skilled in the art, that various changes may be made without departing from the true spirit and scope of the invention. In addition, various modifications may be made to adapt a particular situation, material, apparatus, process or then present objective to the spirit of this invention without departing from its essential teachings.

What is claimed is:

1. A flash lamp comprising a sealed transparent bulb having an ignition mechanism associated therewith, said bulb having a solid substance and a gaseous atmosphere therein, said flash lamp providing electromagnetic radiation upon ignition due to a chemical reaction between said solid substance and said gaseous atmosphere; said solid substance being coated with a solid or semi-solid combustion accelerator, said combustion accelerator being an organic compound having only carbon and halogen atoms in its molecular structure, at least one of said halogen atoms being a chlorine atom.

2. The flash lamp of claim 1 wherein said solid substance is selected from the group consisting of zirconium, hafnium, aluminum, magnesium and the rare earth metals.

3. The flash lamp of claim 1 wherein said gaseous atmosphere comprises fluorine.

4. The flash lamp of claim 1 wherein said gaseous atmosphere comprises a gaseous fluorine compound of a non-metal, said fluorine compound readily dissociating under ignition conditions to yield elemental fluorine which reacts with said solid substance during ignition.

5. The flash lamp of claim 1 wherein said combustion accelerator comprises a totally halogenated hydrocarbon.

6. The flash lamp of claim 1 wherein said combustion accelerator comprises hexachloro-ethane.

7. The flash lamp of claim 1 wherein said combustion accelerator comprises poly-monochloro-trifluoro-ethylene.

8. The flash lamp of claim 1 wherein said combustion accelerator is uniformly coated onto said solid substance.

9. The flash lamp of claim 1 wherein said combustion accelerator is a grease which is uniformly coated onto said solid substance.

10. A flash lamp comprising a sealed transparent bulb having an ignition mechanism associated therewith, said bulb having a solid substance and a gaseous atmosphere therein, said flash lamp providing electromagnetic radiation upon ignition due to a chemical reaction between said solid substance and said gaseous atmosphere; said solid substsnce being coated with a solid or semi-solid combustion accelerator, said combustion accelerator being an organic compound having only carbon and halogen atoms in its molecular structure, at least one of said halogen atoms being a non-fluorine halogen atom.

11. The flash lamp of claim 10 wherein said combustion accelerator comprises a totally halogenated hydrocarbon.

12. The flash lamp of claim 10 wherein said combustion accelerator is uniformly coated onto said solid substance.

13. The flash lamp of claim 10 wherein said combustion accelerator is present in a quantity sufficient to decrease the time from ignition to the time to peak light intensity to the range of about 26 to about 30 milliseconds.

14. The flash lamp of claim 10 wherein said combustion accelerator is present in a quantity sufficient to decrease the time from ignition to time of peak intensity by about 40 percent – 60 percent over flash lamps without said combustion accelerator.

15. The flash lamp of claim 1 wherein said combustion accelerator is present in a quantity sufficient to decrease the time from ignition to the time of peak light intensity to the range of about 26 to about 30 milliseconds.

16. The flash lamp of claim 1 wherein said combustion accelerator is present in a quantity sufficient to decrease the time from ignition to time of peak intensity by about 40 percent – 60 percent over flash lamps without said combustion accelerator.

* * * * *